US008967974B2

(12) United States Patent
Garcia-Crespo

(10) Patent No.: US 8,967,974 B2
(45) Date of Patent: Mar. 3, 2015

(54) COMPOSITE AIRFOIL ASSEMBLY

(75) Inventor: Andres Jose Garcia-Crespo, Greenville, SC (US)

(73) Assignee: General Electric Company, Schenectady, NY (US)

(*) Notice: Subject to any disclaimer, the term of this patent is extended or adjusted under 35 U.S.C. 154(b) by 533 days.

(21) Appl. No.: 13/342,599

(22) Filed: Jan. 3, 2012

(65) Prior Publication Data

US 2013/0171001 A1 Jul. 4, 2013

(51) Int. Cl.
F01D 5/14 (2006.01)
B23P 15/04 (2006.01)
F01D 5/30 (2006.01)
F01D 11/00 (2006.01)
F01D 5/28 (2006.01)

(52) U.S. Cl.
CPC ............ F01D 5/3084 (2013.01); F01D 5/3007 (2013.01); F01D 11/008 (2013.01); F01D 5/147 (2013.01); F01D 5/284 (2013.01); F05D 2300/6033 (2013.01)
USPC ............... 416/193 A; 416/219 R; 416/241 B; 416/248; 29/889.2; 29/889.71

(58) Field of Classification Search
CPC ..... F01D 5/3084; F01D 5/3007; F01D 5/147; F01D 5/284; F01D 11/008; F05D 2300/6033
USPC .......... 416/193 A, 219 R, 241 R, 241 B, 248; 29/889.2, 889.71
See application file for complete search history.

(56) References Cited

U.S. PATENT DOCUMENTS

| | | | |
|---|---|---|---|
| 5,222,865 A | 6/1993 | Corsmeier | |
| 5,399,069 A * | 3/1995 | Marey et al. | 415/209.3 |
| 5,720,597 A | 2/1998 | Wang et al. | |
| 5,791,879 A | 8/1998 | Fitzgerald et al. | |
| 6,139,278 A | 10/2000 | Mowbray et al. | |
| 6,325,593 B1 | 12/2001 | Darkins, Jr. et al. | |
| 6,447,250 B1 * | 9/2002 | Corrigan et al. | 416/193 A |
| 6,553,665 B2 | 4/2003 | Gunn et al. | |
| 6,648,596 B1 | 11/2003 | Grylls et al. | |
| 6,670,026 B2 | 12/2003 | Steibel et al. | |
| 6,915,840 B2 | 7/2005 | Devine, II et al. | |
| 7,005,200 B2 * | 2/2006 | Wang et al. | 428/697 |
| 7,044,709 B2 | 5/2006 | Bruce et al. | |
| 7,284,958 B2 * | 10/2007 | Dundas et al. | 416/193 A |
| 7,510,379 B2 | 3/2009 | Marusko et al. | |
| 7,766,623 B2 | 8/2010 | Chou et al. | |
| 7,874,804 B1 | 1/2011 | Brown | |
| 2011/0142639 A1 | 6/2011 | Campbell et al. | |

FOREIGN PATENT DOCUMENTS

EP 2468434 A1 6/2012

OTHER PUBLICATIONS

EP Search Report and Written Opinion dated Feb. 6, 2014, issued in connection with corresponding EP Application No. 12190922.0.

* cited by examiner

Primary Examiner — Igor Kershteyn
(74) Attorney, Agent, or Firm — Nixon & Vanderhye P.C.

(57) ABSTRACT

A composite blade assembly for mounting on a turbine wheel includes a ceramic airfoil and an airfoil platform. The ceramic airfoil is formed with an airfoil portion, a blade shank portion and a blade dovetail tang. The metal platform includes a platform shank and a radially inner platform dovetail. The ceramic airfoil is captured within the metal platform, such that in use, the ceramic airfoil is held within the turbine wheel independent of the metal platform.

20 Claims, 3 Drawing Sheets

COMPOSITE AIRFOIL ASSEMBLY

GOVERNMENT SUPPORT CLAUSE

This invention was made with Government support under Contract No. DE-FC26-05NT42643 awarded by the Department of Energy. Accordingly, the Government has certain rights in the invention.

BACKGROUND OF THE INVENTION

This invention relates to a composite blade assembly for use in turbomachinery, and particularly to an interface between a ceramic airfoil and a metal platform.

Current practice relating to ceramic blade configurations requires integral platform sections that are incorporated at the base of the airfoil during the manufacturing process. This adds cost to the component due to material, labor and machining costs that are associated with the fabrication of the integrated platform system. In fact, these are rather large costs in the overall cost distribution of the part manufacture.

Other composite blades include separately-formed airfoils and platforms, attached by mechanical means on the rotor. Still other composite blades use chemical joints between their metal platforms and ceramic airfoil sections. These arrangements are also labor-intensive and costly to manufacture.

Making the platform out of a metal material is extremely advantageous for lower temperature applications where the platform is not subjected to the highest temperatures.

Accordingly, there remains a need for a simple and relatively inexpensive ceramic blade configuration that can take advantage of ceramic airfoil technology but in combination with a metal platform which is desirable in some applications.

BRIEF SUMMARY OF THE INVENTION

In one exemplary but nonlimiting embodiment, a composite airfoil assembly for mounting in a slot provided on a turbine wheel is provided that comprises: a ceramic blade formed with an airfoil portion, a blade shank portion and a blade dovetail tang; and a metal platform having a platform shank and a radially inner platform dovetail; the ceramic blade captured within the metal platform, such that in use, the ceramic blade is held within the slot in the turbine wheel independent of the metal platform.

In another aspect, there is provided a turbine rotor wheel fitted with a plurality of composite airfoil assemblies, each airfoil assembly comprising a ceramic blade and a metal platform having a platform shank and a radially inner platform dovetail; the ceramic blade having a blade dovetail tang captured within the metal platform, such that in use, the ceramic blade is held within the turbine wheel independent of the metal platform.

In still another aspect, there is provided a method of assembling a ceramic blade to a metal platform comprising providing a ceramic blade with an airfoil portion, a shank portion and a radially inner dovetail tang; and casting a metal platform about the shank portion and the radially inner dovetail tang of the ceramic blade.

The invention will now be described in detail in connection with the drawings identified below.

DETAILED DESCRIPTION OF THE INVENTION

Figure 1:
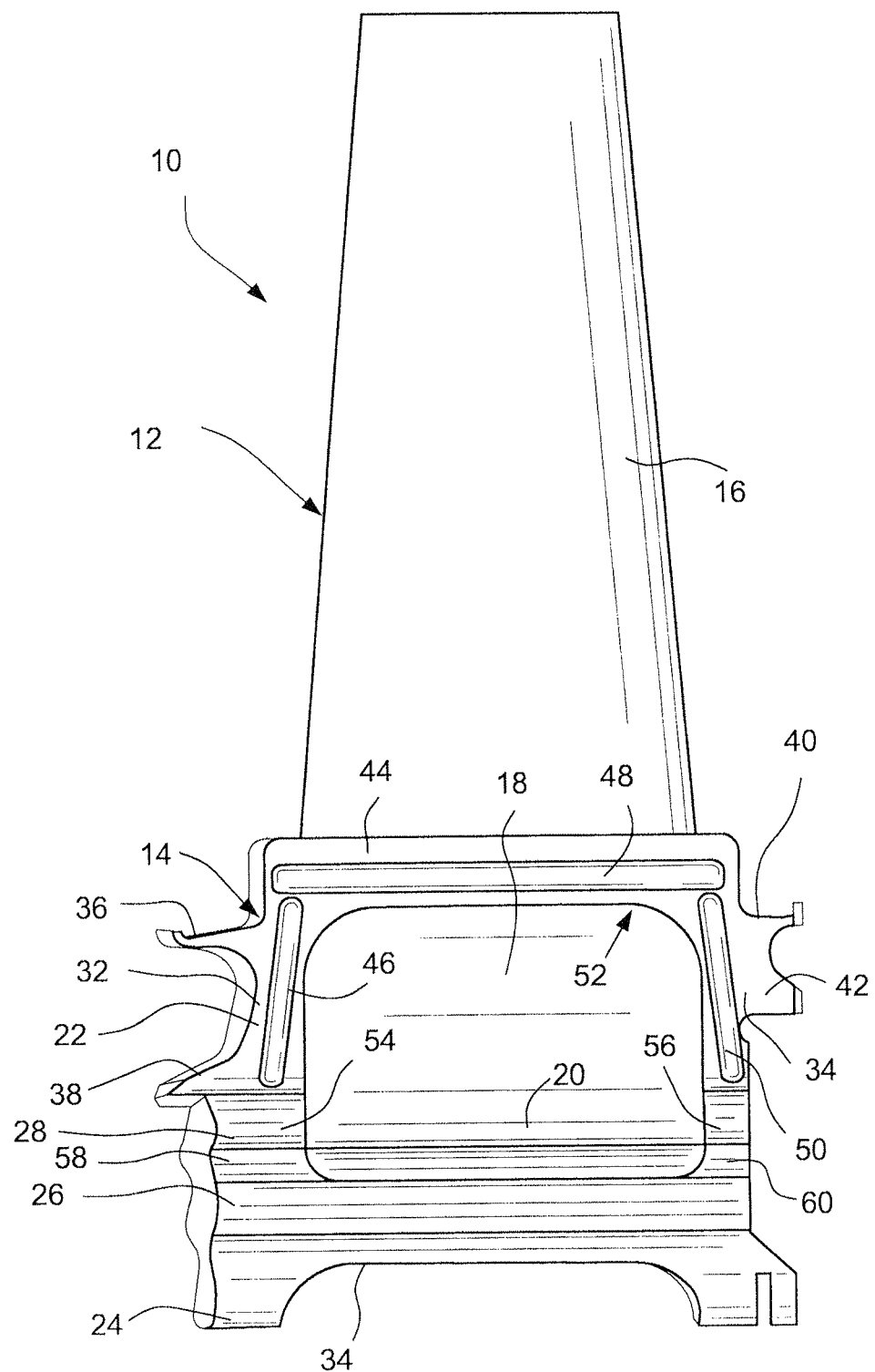
FIG. 1 is a side elevation of a composite blade assembly in accordance with an exemplary but nonlimiting embodiment of the invention.
Figure 2:
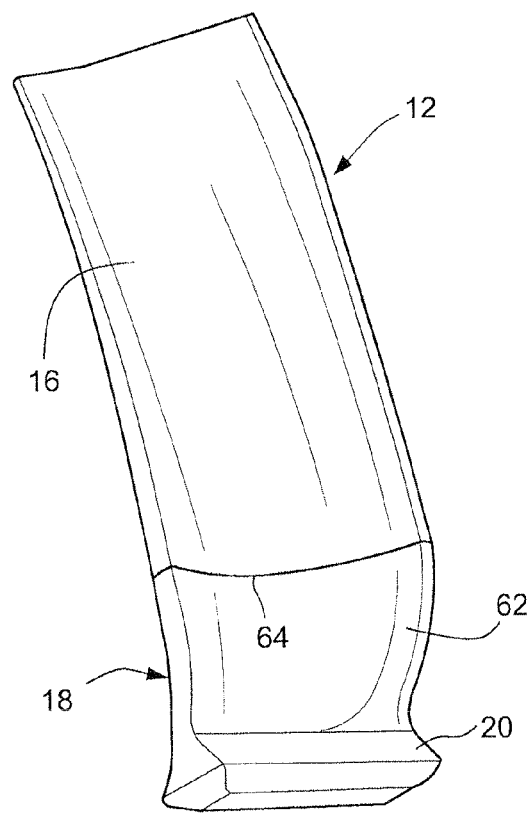
FIG. 2 is a perspective view of the airfoil portion removed from the blade assembly of FIG. 1.
Figure 3:
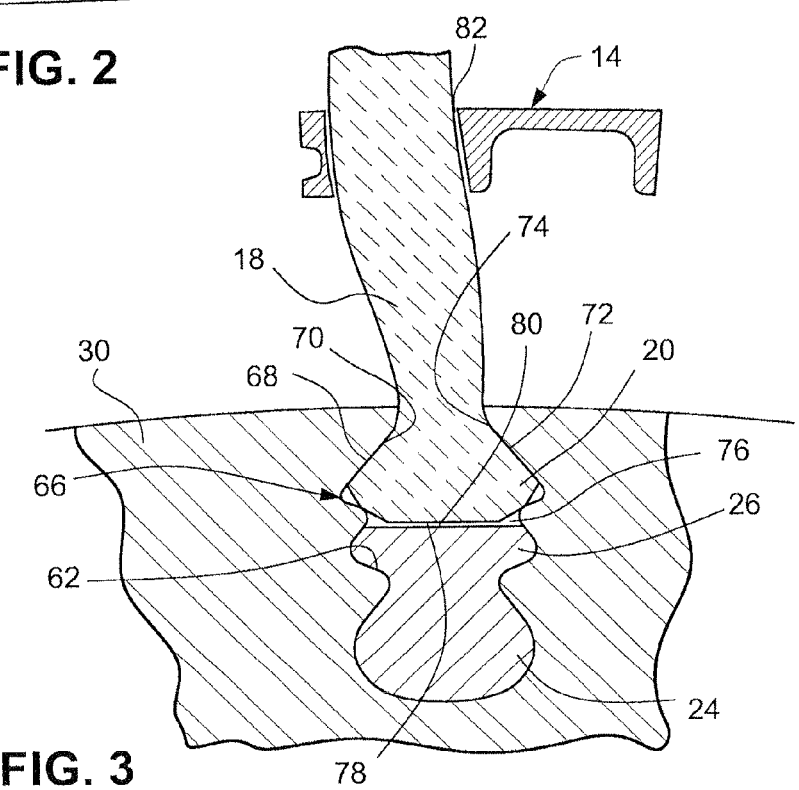
FIG. 3 is a partial cross section of the blade assembly of FIG. 1 installed on a rotor wheel.

With reference initially to FIGS. 1-3, a composite blade assembly 10 in accordance with an exemplary but nonlimiting embodiment of the invention includes a ceramic airfoil 12 and a metal platform 14. As best seen in FIG. 2, the ceramic airfoil 12 includes an airfoil portion 16 a shank portion 18 and a dovetail tang 20 at its radially innermost end.

The metal platform 14 (FIG. 1) includes a platform shank 22 and oppositely-extending and otherwise conventional platform dovetail tangs 24, 26 and 28 that are adapted to be received in a mating slot formed in a rotor wheel 30 (see FIG. 3) as described further herein. The platform shank 22 includes opposite shank ends 32, 34 provided with angel wing seals 36, 38 on one end, and seals 40, 42 on the opposite end. One or both of the so-called "slash faces" (one shown at 44) may be formed with elongated grooves 46, 48, 50 to allow placement of axial and/or radial pin seals (not shown), if required. The metal platform 14 is thus seen to be substantially hollow, with a cavity 52 defined generally between the platform slash face 44, the shank ends 32, 34, and the intermediate dovetail tang 26. Thus, a portion of the radially outer platform tang 28 is cut out between the ends 54, 56, and a portion of the transition area leading to the intermediate platform tang 26 is cut out between the ends 58, 60 so as to form part of the platform cavity 52 for a reason explained further below.

In the exemplary but nonlimiting embodiment, the ceramic airfoil 12 is formed of, for example, a CMC material, a silicon matrix fiber material, a silicon nitride ceramic, or monolithic ceramic material without fibers. Other suitable ceramic materials may be employed, but in all cases, the ceramic material must have sufficient high temperature properties to withstand not only turbine operating temperatures but also the casting temperatures during manufacture of the metal platform about the airfoil as described below.

In the exemplary but nonlimiting embodiment, the airfoil shank portion 18 and airfoil dovetail tang 20 are partially enclosed by a ceramic slurry indicated at 62 in FIG. 2, extending from an interface at 64 to (and including) the underside of the tang 20. The platform 14 is thereafter cast about the airfoil 12 by a conventional casting process so as to produce the configuration shown in FIGS. 1 and 3 where the airfoil shank portion 18 and the airfoil dovetail tang 20 are captured within the platform cavity 52 without any sort of metallurgical or chemical bond. Note that the airfoil dovetail tang 20 fits within the platform dovetail cut out 52 and is shaped so as to form a substantial continuation of the upper platform tang 28, between the ends 54, 56, thereby permitting loading of the blade assembly 10 onto the rotor wheel 30 in the usual fashion. The airfoil dovetail tang 20 is not, however, otherwise attached or secured to the metal platform. As best seen in FIGS. 1 and 3, when the composite blade assembly is loaded onto the turbine rotor wheel 30, the platform dovetail tangs 24, 26 and 28 fit within the mating dovetail slot 66 in the rotor wheel 30, with the airfoil dovetail tang 20 independently anchored within the radially outer end of the slot 66, and axially between the ends 54, 56 of the platform tangs 28. When the turbine is in operation, centrifugal forces will drive the airfoil 12 in a radially outward direction causing contact between the mated surfaces 68, 70 and 72, 74 of the airfoil tang 20 and rotor slot 66. As a result, there remains a slight radial gap 76 between the inner surface 78 of the blade tang 20 and the adjacent surface 80 of the platform tang 26 defining the radially innermost surface of the cavity 52.

At the same time, the airfoil portion 16 is also not sealed where it enters the metal platform 14. Rather, a very slight gap 82 extends about the metal periphery of the airfoil portion 16, as also best seen in FIG. 3. The gap 82 accommodates the different thermal coefficients of expansion of the ceramic and metal materials, and can be sealed by conventional mechanical methods that do not transfer loads between the airfoil and the platform.

Figure 4:
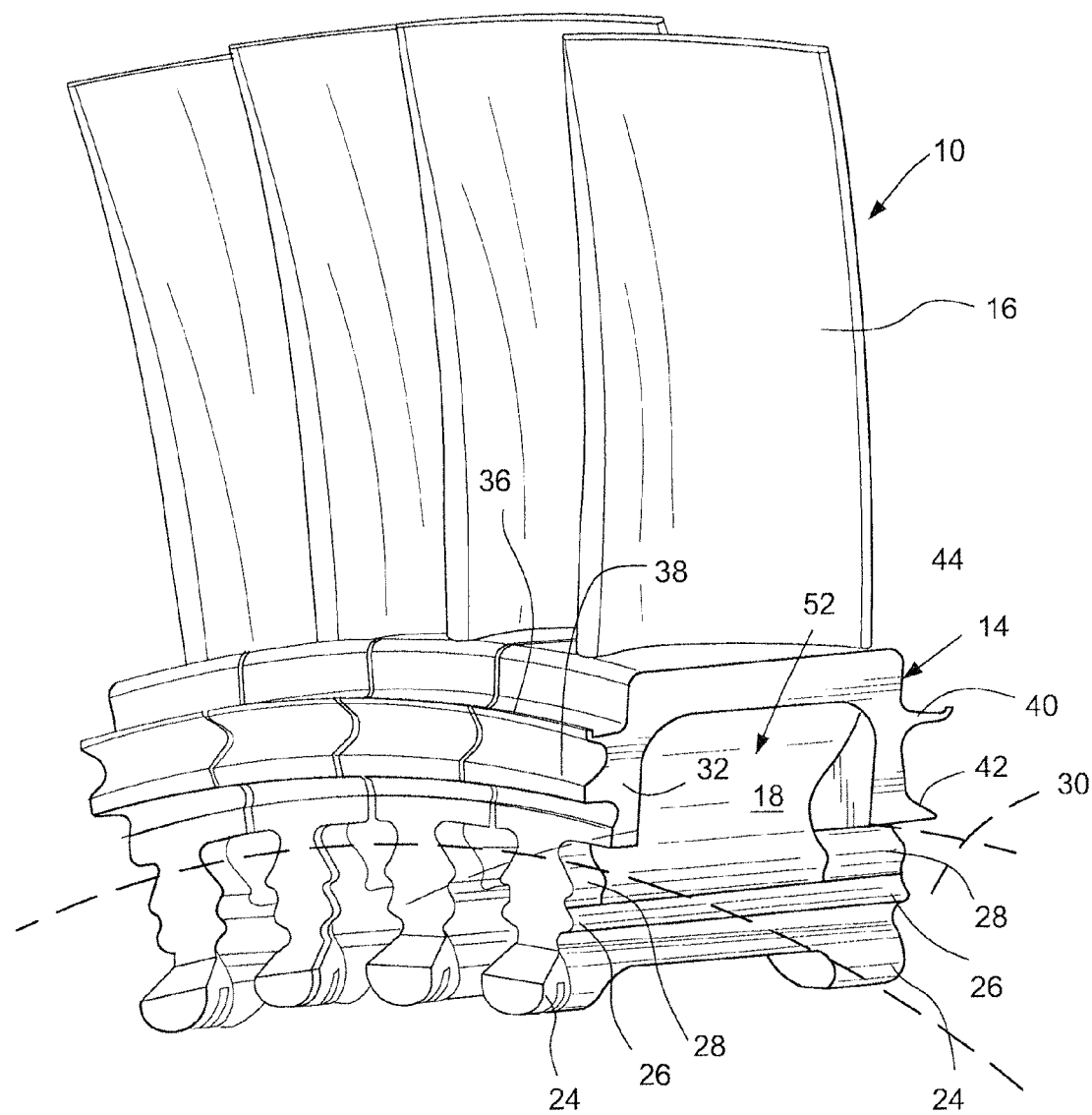
FIG. 4 is a perspective view of a group of four composite blade assemblies in accordance the exemplary but nonlimiting embodiment of the invention.

FIG. 4 illustrates a group of 4 substantially identical composite blade assemblies 10 loaded onto the rotor wheel 30. Each of the blade assemblies are configured and assembled as described above, understanding that the blades extend about the periphery of the wheel.

The ceramic blade assembly 10 described herein has many advantages. For example, when the composite blade assembly 10 is installed on the turbine rotor wheel 30, the lower support features or surfaces on the rotor wheel dovetail or fir tree slot 66 will carry the metal platform 14 while the upper lobes or tangs of the rotor wheel slot will carry the ceramic blade shank 18 as described above and as best seen in FIG. 3. This arrangement finally decouples the metal platform from the ceramic airfoil, preventing possible cracking due to thermal mismatches during thermal inclusions. The small gap 80 between the perimeter of the airfoil and the metal platform can be managed so that leakage from the shank cavity does not alter the purge flow requirements on the metal system. The ceramic airfoil can be manufactured without an integral platform and then used in the casting process where the metallic platform is cast around the CMC airfoil, while controlling the gaps between the airfoil and the platform. In addition, no complimentary hooks or other means of attachment are required to secure the airfoil 12 to the platform 14. Accordingly, the ceramic airfoil will not contact the metal platform system during manufacturing or during operation.

It has been determined that the described arrangement may yield a positive step change in combined cycle efficiency per blade row in the engine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composite blade assembly for mounting in a slot provided on a turbine wheel, the composite blade assembly comprising:
   a ceramic airfoil formed with an airfoil portion, an airfoil shank portion and an airfoil dovetail tang, wherein the airfoil dovetail tang includes a leading edge, a trailing edge, and a radially inward surface extending between the leading edge and the trailing edge; and
   a metal platform having a platform shank, a platform shank cavity and a radially inner platform dovetail, wherein a length of the radially inner platform dovetail is radially inward of and borders the radially inward surface of the dovetail tang;
   said ceramic airfoil dovetail tang captured within said metal platform shank cavity, such that in use, said ceramic airfoil is held within the slot in the turbine wheel independent of said metal platform.

2. The composite blade assembly of claim 1 wherein said airfoil portion projects through an opening in a radially outer surface of said metal platform.

3. The composite blade assembly of claim 2 wherein said radially inner platform dovetail includes at least one dovetail tang, said at least one dovetail tang formed with a partial cut-out between opposite ends thereof.

4. The composite blade assembly of claim 3 wherein said partial cut out is substantially centered between said opposite ends.

5. The composite blade assembly of claim 4 wherein said blade dovetail tang forms a continuation of said at least one platform dovetail tang.

6. The composite blade assembly of claim 1 wherein said ceramic airfoil is comprised of a CMC composite material.

7. The composite airfoil assembly of claim 1 wherein said ceramic airfoil is comprised of a silicon matrix fiber material.

8. The composite airfoil assembly of claim 1 wherein said ceramic airfoil is comprised of a silicon nitride or a monolithic ceramic material.

9. A turbine rotor wheel comprised of:
   a plurality of composite blade assemblies, each blade assembly comprising a ceramic airfoil and a metal platform, the ceramic airfoil includes a ceramic dovetail tang comprising a leading edge, a trailing edge and a radially inward surface extending between the leading edge and the trailing edge, and
   the metal platform including a platform shank and a radially inner platform dovetail, wherein the radially inner platform dovetail includes a length of a dovetail portion radially inward of and bordering the radially inward surface of the dovetail tang; and
   said ceramic airfoil dovetail tang is captured within said metal platform.

10. The turbine rotor wheel of claim 9 wherein said radially inner platform dovetail is formed with a partial cut-out to receive said ceramic airfoil dovetail tang.

11. The turbine rotor wheel of claim 10 wherein said radially inner platform dovetail includes at least one dovetail tang, said at least one dovetail tang formed with said partial cut-out.

12. The turbine rotor wheel of claim 11 wherein said partial cut out is substantially centered between opposite ends of said at least one dovetail tang.

13. The turbine rotor wheel of claim 12 wherein said ceramic airfoil dovetail tang is aligned along an axial direction with said at least one dovetail tang of the radially inner platform.

14. The turbine rotor wheel of claim 9 wherein said ceramic airfoil is comprised of a CMC composite material.

15. The turbine rotor wheel of claim 9 wherein said radially inner platform dovetail includes at least three dovetail tangs, a radially outer one of said at least three dovetail tangs formed with said partial cut-out; and said radially inner dovetail tang of said ceramic airfoil forms a continuation of said radially outer one of said at least three dovetail tangs.

16. The turbine rotor wheel of claim 9 wherein said ceramic airfoil is comprised of a silicon nitride or monolithic ceramic material.

17. A method of assembling a ceramic airfoil to a metal platform comprising:
   a. providing a ceramic airfoil with an airfoil portion, a shank portion and a radially inner dovetail tang; and
   b. casting a metal platform about the shank portion and the radially inner dovetail tang of the ceramic airfoil, wherein the casting includes casting a length of the radially inner dovetail tang to be radially inward of and boarding a radially inward surface of the radially inner dovetail tang of the ceramic airfoil.

18. The method of claim 17 wherein said metal platform is formed with a platform shank and a radially inner platform dovetail; said ceramic airfoil portion projecting through an opening in a radially outer surface of said metal platform.

19. The method of claim 18 wherein said radially inner portion dovetail includes a dovetail tang with a center section cutout, and wherein said radially inner dovetail tang of said ceramic airfoil is received within said center section cutout.

20. The method of claim 19 including maintaining, in use, a clearance between a radially inner surface of said radially inner dovetail tang of said ceramic airfoil and an outer surface of said radially inner dovetail tang of said radially inner platform dovetail.

* * * * *